(12) United States Patent
Guyomard et al.

(10) Patent No.: US 7,842,273 B2
(45) Date of Patent: Nov. 30, 2010

(54) METHOD FOR THE PREPARATION OF $\gamma LiV_2O_5$

(75) Inventors: Dominique Guyomard, Sautron (FR); Joël Gaubicher, Nantes (FR); Marc Deschamps, Quimper (FR); Matthieu Dubarry, Honolulu, HI (US); Benoit Morel, Champagne Mouton (FR)

(73) Assignees: Batscap, Ergue-Gaberic (FR); Centre National de la Recherche Scientifique, Paris (FR)

( * ) Notice: Subject to any disclaimer, the term of this patent is extended or adjusted under 35 U.S.C. 154(b) by 559 days.

(21) Appl. No.: 11/665,920

(22) PCT Filed: Oct. 18, 2005

(86) PCT No.: PCT/FR2005/002579

§ 371 (c)(1),
(2), (4) Date: Nov. 26, 2007

(87) PCT Pub. No.: WO2006/045921

PCT Pub. Date: May 4, 2006

(65) Prior Publication Data

US 2008/0076025 A1 Mar. 27, 2008

(30) Foreign Application Priority Data

Oct. 22, 2004 (FR) .................................. 04 11312

(51) Int. Cl.
*C01G 31/00* (2006.01)
(52) U.S. Cl. ................. 423/594.8; 423/179.5; 423/265; 423/414
(58) Field of Classification Search .............. 423/179.5, 423/265, 414, 594.8
See application file for complete search history.

(56) References Cited

U.S. PATENT DOCUMENTS

| | | | | |
|---|---|---|---|---|
| 5,512,214 | A * | 4/1996 | Koksbang | .................... 252/506 |
| 6,528,033 | B1 * | 3/2003 | Barker et al. | ................. 423/306 |
| 6,716,372 | B2 * | 4/2004 | Barker et al. | ............. 252/518.1 |
| 2002/0086214 | A1 | 7/2002 | Barker et al. | |

FOREIGN PATENT DOCUMENTS

EP    0397608    11/1990

OTHER PUBLICATIONS

J. Barker et al., "A Carbothermal Reduction Method for the Preparation of Electroactive Materials for Lithium Ion Application", Journal of the Electrochemical Society, vol. 150, No. 6, 2003, pp. A684-A688, XP002332263.
International Search Report mailed Mar. 9, 2006.

* cited by examiner

*Primary Examiner*—Steven Bos
(74) *Attorney, Agent, or Firm*—Merchant & Gould

(57) ABSTRACT

The invention relates to the preparation of an optionally carbonaceous $\gamma$-$LiV_2O_5$ material.

The process consists in preparing a composition formed of carbon and of precursors of Li and of V and in subjecting it to a heat treatment. The composition is prepared by bringing carbon, $\alpha$-$V_2O_5$ and a Li precursor into contact in amounts such that the ratio of the [$V_2O_5$]/[Li] concentrations is between 0.95 and 1.05 and the carbon is in excess of at least 25% with respect to the stoichiometry. The heat treatment is carried out in two stages: a first stage at a temperature between 90° C. and 150° C. for a time of 1 to 12 hours and a second stage at a temperature between 420° C. and 500° C. for a time of between 10 min and 1 hour, under a nitrogen or argon atmosphere or under vacuum.

Applications: positive electrode active material.

9 Claims, 2 Drawing Sheets

METHOD FOR THE PREPARATION OF γLIV$_2$O$_5$

The present invention relates to a process for the preparation of γ-LiV$_2$O$_5$.

BACKGROUND OF THE INVENTION

Batteries comprising a positive electrode and a negative electrode separated by an electrolyte comprising a lithium salt in solution in a solvent are widely known. The operation of these batteries is provided by the reversible circulation of lithium ions in the electrolyte between the electrodes. The positive electrode is generally composed of a composite material comprising an active material, a binder, a material conferring electron conduction and optionally a compound conferring ionic conduction. The compound conferring electron conduction can be a carbon black which does not catalyze the oxidation of the electrolyte at a high potential.

It is known to use a γ-Li$_x$V$_2$O$_5$ compound as positive electrode active material in a battery operating by exchange of lithium ions between the anode and the cathode through the electrode. A process for the preparation of γ-LiV$_2$O$_5$ is described by J. Barker et al. [Journal of the Electrochemical Society, 150, (6) A684-A688 (2003)]. Said process consists in preparing a mixture of Li$_2$CO$_3$, of V$_2$O$_5$ and of carbon, in compressing the mixture, in order to form pellets therefrom, and in then subjecting the pellets to a heat treatment under an argon atmosphere in a furnace at 600° C. for 60 min. It is specified that, at a temperature of 525° C., a time of 10 hours is required to obtain pure γ-LiV$_2$O$_5$. In addition, U.S. Pat. No. 6,716,372 describes a process which consists in mixing Li$_2$CO$_3$, V$_2$O$_5$ and carbon, in compressing the mixture, in order to form pellets therefrom, in bringing the mixture to a temperature between 400° C. and 650° C. at the rate of 2° C./min, in maintaining at this temperature for a certain time and in then allowing to cool at the rate of 2° C./min. The duration of the maintenance at high temperature is of the order of 1 hour for 600 or 650° C. and of the order of 8 hours for 500° C.

The aim of the present invention is to provide a simple and inexpensive process for the preparation of a material composed of pure γ-LiV$_2$O$_5$ or of γ-LiV$_2$O$_5$ as an intimate mixture with carbon.

SUMMARY OF INVENTION

The process according to the present invention consists in preparing a composition formed of carbon and of precursors of Li and V and in subjecting said composition to a heat treatment. It is characterized in that:
- the composition is prepared by bringing carbon, α-V$_2$O$_5$ and a Li precursor into contact in amounts such that the ratio of the [V$_2$O$_5$]/[Li] concentrations is between 0.95 and 1.05 and the carbon is in excess of at least 25% with respect to the stoichiometry;
- the heat treatment is carried out in two stages: a first stage at a temperature of between 90° C. and 150° C. for a time of 1 to 12 hours and a second stage at a temperature of between 420° C. and 500° C. for a time of between 10 min and 1 hour, under a nitrogen or argon atmosphere or under vacuum.

DETAILED DESCRIPTION OF THE PREFERRED EMBODIMENTS

Figure 1:
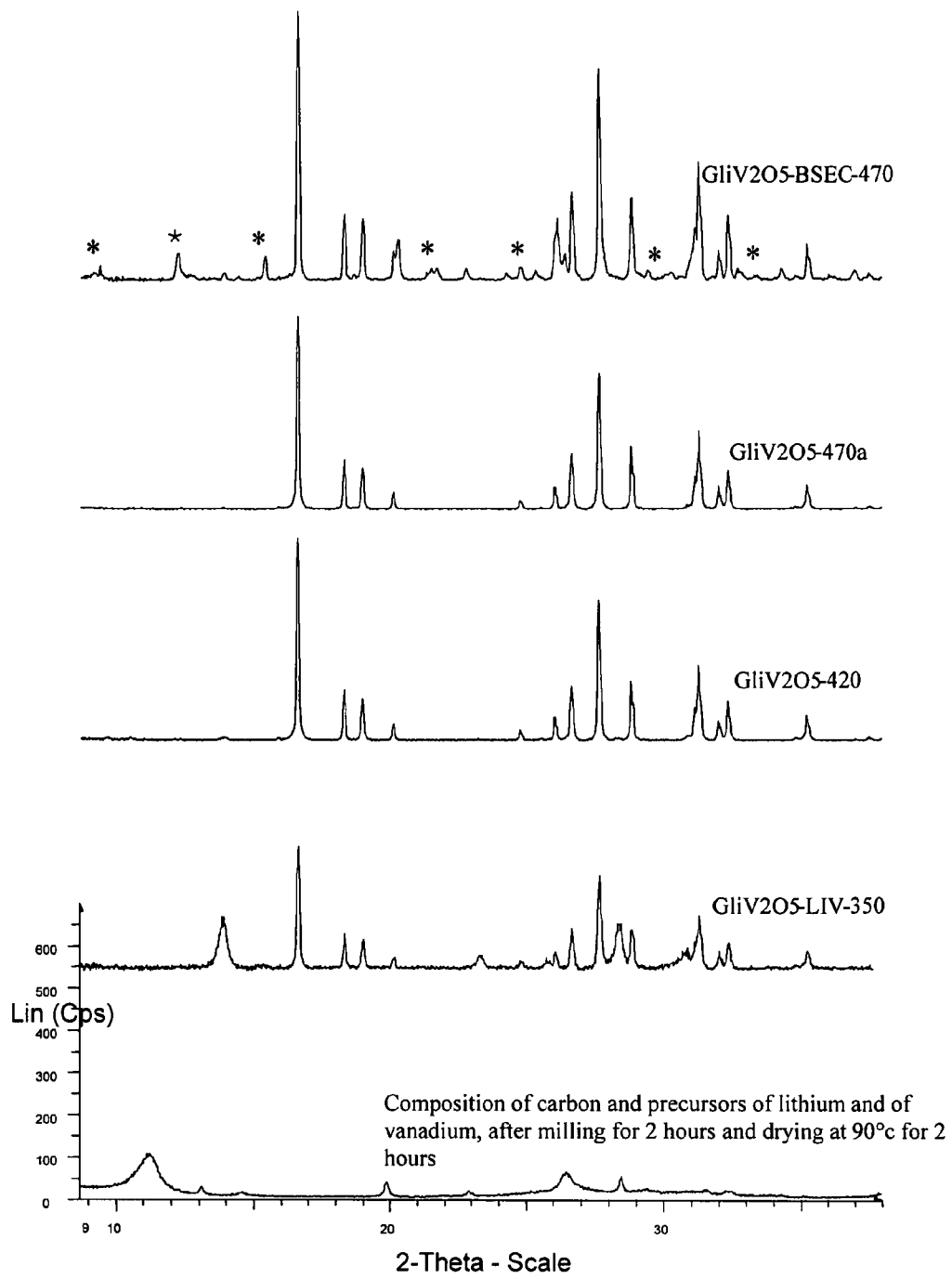
FIG. 1 is the X-ray diffraction diagrams of the compounds GliV2O5-420, GliV2O5-470a and GliV2O5-BSEC-470 and that corresponding to the composition formed of carbon and of precursors of Li and of V formed after stirring in a bead mill for 2 hours and drying for 2 hours in the air at 90° C. without the second stage of heat treatment.

The first stage is carried out with vigorous stirring. In a preferred embodiment, it is carried out in a bead mill.

The first stage of the heat treatment can be carried out in air. The duration of this stage depends on the temperature. It can be reduced to approximately 1 hour by putting the composition to be treated into the form of a thin layer.

If the duration of the second stage of the heat treatment is less than 10 min or if the temperature of the second stage of the heat treatment is less than 420° C., the material obtained is not pure γ-LiV$_2$O$_5$; it comprises Li$_{1+α}$V$_3$O$_8$ and/or β-Li$_x$V$_2$O$_5$ (0<x<0.7). A duration of greater than 1 hour results in an increase in the size of the crystallites which leads to a poorer battery performance.

The first stage of the heat treatment can be carried out in an oven before introducing the composition into the furnace which will be used for the second stage of the heat treatment. The first stage of the heat treatment can also be carried out in the furnace used for the second stage, if the furnace comprises at least two treatment regions, one at the temperature of the first stage and the other at the temperature of the second stage.

In a first embodiment, the Li precursor is LiOH.H$_2$O or Li$_2$CO$_3$. The vanadium precursor, α-V$_2$O$_5$, the lithium precursor and the carbon are introduced into an amount of water such that a viscous suspension is obtained and vigorous stirring is maintained for a time of 1 to 2 hours. The concentrations of precursors can vary between 0.5 mol/l and 5 mol/l for α-V$_2$O$_5$, between 0.25 mol/l and 2.5 mol/l for the lithium precursor Li$_2$CO$_3$ and between 0.5 mol/l and 5 mol/l for the lithium precursor LiOH.H$_2$O.

If the same precursors are mixed in the absence of water, the composition formed of carbon and of precursors of Li and of V results in a mixture of γ-LiV$_2$O$_5$ and β-Li$_x$V$_2$O$_5$ (0<x<0.7) after the second heat treatment.

In a second embodiment, an aqueous solution comprising from 10 to 50% by volume of hydrogen peroxide is added to the reaction medium and vigorous stirring is maintained for 5 minutes. The limiting concentrations which can be used are from 0.05 mol/l to 2 mol/l for α-V$_2$O$_5$ and from 0.025 mol/l to 2 mol/l for the Li precursor.

In the second embodiment:
- the lithium precursor can be chosen from Li$_2$CO$_3$ LiOH.H$_2$O, LiCl, LiNO$_3$ or a lithium salt of a carboxylic acid, for example chosen from lithium acetylacetonate, lithium acetate, lithium stearate, lithium formate, lithium oxalate, lithium citrate, lithium lactate, lithium tartrate or lithium pyruvate;
- an aqueous suspension of α-V$_2$O$_5$ and of carbon is prepared and an aqueous peroxide solution is added thereto, it being possible for the lithium precursor to be introduced into the aqueous suspension of α-V$_2$O$_5$ and of carbon before the addition of the peroxide solution or after the addition of the peroxide solution, that is to say during the formation of the gel, and the mixture is left under vigorous stirring for 5 min;

the respective amounts of Li precursor and of α-$V_2O_5$ in the reaction medium are preferably such that 0.1/z mol·l$^{-1}$<[Li]<1 l/z mol·l$^{-1}$; 0.1 mol·l$^{-1}$<[$V_2O_5$]<1 mol·l$^{-1}$, z being the number of lithium atoms per formula unit of the precursor.

Excessively high concentrations of reactants can bring about effervescence, while excessively low concentrations give precipitates.

When the excess of carbon in the reaction medium is not greater than 25%, the material obtained by the process of the invention is a material composed of agglomerates of small γ-$LiV_2O_5$ needles.

When the excess of carbon in the reaction medium is greater than 25%, the material obtained is composed of agglomerates of small γ-$LiV_2O_5$ needles surrounded by a noncontinuous layer of spherical carbon particles. Such a material is denoted hereinafter by carbonaceous γ-$LiV_2O_5$.

A material obtained by the process according to the present invention can be used for the preparation of a composite positive electrode for a lithium battery or for a lithium ion battery.

In a particular embodiment, a positive electrode according to the present invention is composed of a composite material which comprises:
 a carbonaceous or noncarbonaceous compound obtained by the process of the present invention,
 a binder conferring mechanical strength,
 optionally a compound conferring electron conduction,
 optionally a compound conferring ionic conduction.

The content of carbonaceous or noncarbonaceous γ-$LiV_2O_5$ is preferably between 90 and 100% by weight. The content of binder is preferably less than 10% by weight. The content of compound conferring electron conduction is preferably less than or equal to 5% by weight and the content of material conferring ionic conduction is preferably less than or equal to 5% by weight. For the electrodes composed of noncarbonaceous γ-$LiV_2O_5$, it is preferable for the composite material constituting the positive electrode to comprise a compound conferring electron conduction and a binder.

The binder can be composed of a nonsolvating polymer, of a solvating polymer or of a mixture of solvating polymer and of nonsolvating polymer. It can additionally comprise one or more liquid polar aprotic compounds. The nonsolvating polymer can be chosen from vinylidene fluoride homopolymers and copolymers, copolymers of ethylene, of propylene and of diene, tetrafluoroethylene homopolymers and copolymers, N-vinylpyrrolidone homopolymers and copolymers, acrylonitrile homopolymers and copolymers, and methacrylonitrile homopolymers and copolymers. Poly(vinylidene fluoride) is particularly preferred. The nonsolvating polymer can carry ionic functional groups. Mention may be made, as examples of such a polymer, of polyperfluoroether sulfonate salts, some of which are sold under the name Nafion®, and polystyrene sulfonate salts.

The solvating polymer can be chosen, for example, from polyethers of linear, comb or block structure, which may or may not form a network, based on poly(ethylene oxide); copolymers comprising the ethylene oxide or propylene oxide or allyl glycidyl ether unit; polyphosphazenes; crosslinked networks based on polyethylene glycol crosslinked by isocyanates; copolymers of ethylene oxide and of epichlorohydrin; and networks obtained by polycondensation and carrying groups which make possible the incorporation of crosslinkable groups.

The polar aprotic compound can be chosen from linear or cyclic carbonates, linear or cyclic ethers, linear or cyclic esters, linear or cyclic sulfones, sulfamides and nitriles.

The compound conferring ionic conduction is a lithium salt advantageously chosen from $LiClO_4$, $LiPF_6$, $LiAsF_6$, $LiBF_4$, $LiR_FSO_3$, $LiCH_3SO_3$, lithium bisperfluoroalkylsulfonimides or lithium bis- or trisperfluorosulfonylmethides.

The compound conferring electron conduction can be chosen, for example, from carbon blacks, graphites, carbon fibers, carbon nanowires or carbon nanotubes.

A composite positive electrode according to the invention can be prepared by mixing carbonaceous or non-carbonaceous γ-$LiV_2O_5$ and a binder in an appropriate solvent, and optionally a lithium salt, by spreading the mixture obtained over a metal disk acting as collector (for example an aluminum disk) and by then evaporating the solvent under hot conditions under a nitrogen atmosphere. The solvent is chosen according to the binder used. In addition, a positive electrode can be prepared by extrusion of a mixture of its constituents.

An electrode thus constituted can be used in a battery comprising a positive electrode and a negative electrode separated by an electrolyte comprising a lithium salt in solution in a solvent. The operation of such a battery is provided by the reversible circulation of lithium ions in the electrolyte between the electrodes. One of the subject matters of the present invention is a battery in which the electrolyte comprises a lithium salt in solution in a solvent, characterized in that it comprises a positive electrode comprising, as active material, carbonaceous or noncarbonaceous γ-$LiV_2O_5$ prepared according to the process of the present invention.

In a battery according to the invention, the electrolyte comprises at least one lithium salt in solution in a solvent. Mention may be made, as examples of salts, of $LiClO_4$, $LiAsF_6$, $LiPF_6$, $LiBF_4$, $LiR_FSO_3$, $LiCH_3SO_3$, $LiN(R_FSO_2)_2$, $LiC(R_FSO_2)_3$ and $LiCF(R_FSO_2)_2$, $R_F$ representing a perfluoroalkyl group having from 1 to 8 carbon atoms or a fluorine atom.

The solvent of the electrolyte can be composed of one or more polar aprotic compounds chosen from linear or cyclic carbonates, linear or cyclic ethers, linear or cyclic esters, linear or cyclic sulfones, sulfamides and nitriles. The solvent is preferably composed of at least two carbonates chosen from ethylene carbonate, propylene carbonate, dimethyl carbonate, diethyl carbonate and ethyl methyl carbonate. A battery having a polar aprotic solvent electrolyte generally operates in a temperature range from −20° C. to 60° C.

The solvent of the electrolyte can additionally be a solvating polymer. Mention may be made, as examples of solvating polymers, of polyethers of linear, comb or block structure, which may or may not form a network, based on poly(ethylene oxide); copolymers comprising the ethylene oxide or propylene oxide or allyl glycidyl ether unit; polyphosphazenes; crosslinked networks based on polyethylene glycol crosslinked by isocyanates; copolymers of oxyethylene and of epichlorohydrin as disclosed in FR-2 770 034; and networks obtained by polycondensation and carrying groups which make possible the incorporation of crosslinkable groups. Mention may also be made of block copolymers in which some blocks carry functional groups which have redox properties. A battery having a polymeric solvent electrolyte generally operates in a temperature range from 60° C. to 120° C.

In addition, the solvent of the electrolyte can be a mixture of a liquid polar aprotic compound chosen from the polar aprotic compounds mentioned above and of a solvating polymer. It can comprise from 2 to 98% by volume of liquid solvent, depending on whether a plasticized electrolyte with a low content of polar aprotic compound or a gelled electrolyte with a high content of polar aprotic compound is desired.

When the polymeric solvent of the electrolyte carries ionic functional groups, the lithium salt is optional.

The solvent of the electrolyte can also be a mixture of a polar aprotic compound as defined above or of a solvating polymer as defined above and of a nonsolvating polar polymer comprising units comprising at least one heteroatom chosen from sulfur, oxygen, nitrogen and fluorine. Such a nonsolvating polymer can be chosen from acrylonitrile homopolymers and copolymers, fluorovinylidene homopolymers and copolymers, and N-vinylpyrrolidone homopolymers and copolymers. In addition, the nonsolvating polymer can be a polymer carrying ionic substituents and in particular a polyperfluoroether sulfonate salt (such as an above-mentioned Nafion®, for example) or a polystyrene sulfonate salt.

In another embodiment, the electrolyte of the battery of the present invention can be an inorganic conducting solid chosen from the compounds generally denoted by Lisicon, that is to say $Li_4XO_4$—$Li_3YO_4$ (X=Si or Ge or Ti; Y=P or As or V), $Li_4XO_4$—$Li_2AO_4$ (X=Si or Ge or Ti; A=Mo or S), $Li_4XO_4$—$LiZO_2$ (X=Si or Ge or Ti; Z=Al or Ga or Cr), $Li_4XO_4$—$Li_2BXO_4$ (X=Si or Ge or Ti; B=Ca or Zn), $LiO_2$—$GeO_2$—$P_2O_5$, $LiO_2$—$SiO_2$—$P_2O_5$, $LiO_2$—$B_2O_3$—$Li_2SO_4$, $LiF$—$Li_2S$—$P_2S_5$, $Li_2O$—$GeO_2$—$V_2O_5$ or $LiO_2$—$P_2O_5$—$PON$ solid solutions. A lithium battery comprising such an electrolyte operates within a very broad temperature range, of the order of −20° C. to 100° C.

Of course, the electrolyte of a battery of the present invention can additionally comprise the additives conventionally used in this type of material and in particular a plasticizer, a filler, other salts, and the like.

The negative electrode of the battery can be composed of lithium metal or a lithium alloy which can be chosen from the alloys β-LiAl, γ-LiAl, Li—Pb (for example $Li_7Pb_2$), Li—Cd—Pb, Li—Sn, Li—Sn—Cd, Li—Sn in various matrices, in particular oxygen-comprising matrices or metal matrices (for example Cu, Ni, Fe or Fe—C), or Li—Al—Mn. The battery is then a lithium battery. When the compound γ-$LiV_2O_5$ obtained by the process of the invention is used for the preparation of the positive electrode, the battery is in the discharged state.

In addition, the negative electrode of the battery can be composed of a composite material comprising a binder and a material capable of reversibly inserting lithium ions at low redox potential (hereinafter denoted by insertion material), said composite material being lithiated during a preliminary stage. The insertion material can be chosen from natural or synthetic carbonaceous materials. These carbonaceous materials can, for example, be a petroleum coke, a graphite, a graphite whisker, a carbon fiber, mesocarbon microbeads, a pitch coke or a needle coke. The insertion material can additionally be chosen from oxides, such as, for example, $Li_xMoO_2$, $Li_xWO_2$, $Li_xFe_2O_3$, $Li_4Ti_5O_{12}$ or $Li_xTiO_2$, or from sulfides, such as, for example, $Li_9Mo_6S_6$ and $LiTiS_2$, or from oxysulfides. Use may also be made of compounds which make it possible to reversibly store lithium at low potential, such as amorphous vanadates (for example $Li_xNiVO_4$), nitrides (for example $Li_{2.6-x}Co_{0.4}N$, $Li_{2+x}FeN_2$ or $Li_{7+x}MnN_4$), phosphides (for example $Li_{9-x}VP_4$), arsenides (for example $Li_{9-x}VAs_4$) and reversibly decomposable oxides (for example CoO, CuO or $Cu_2O$). The binder is an organic binder which is electrochemically stable in the range of operation of the negative electrode. Mention may be made, by way of examples, of poly(vinylidene fluoride) homopolymers or an ethylene/propylene/diene copolymer. A poly(polyvinylidene fluoride) is particularly preferred. A composite negative electrode can be prepared by introducing the carbonaceous compound into a solution of the binder in a polar aprotic solvent, by spreading the mixture obtained over a copper disk acting as collector and by then evaporating the solvent under hot conditions under a nitrogen atmosphere. When the negative electrode is composed of an insertion material, the battery is said to be a "lithium ion battery". When the compound γ-$LiV_2O_5$ obtained by the process of the invention is used for the preparation of the positive electrode of such a battery, the battery is in the charged state.

A battery according to the invention comprising a solid electrolyte can be provided in the form of a succession of layers composed respectively of the material of the positive electrode according to the invention and its current collector, the solid electrolyte, and the negative electrode and optionally its current collector.

A battery according to the invention comprising a liquid electrolyte can also be provided in the form of a succession of layers composed respectively of the material of the positive electrode according to the invention and its current collector, a separator impregnated by the liquid electrolyte, and the material constituting the negative electrode and optionally its current collector.

The present invention is illustrated in more detail by the examples given below, to which, however, it is not limited.

Example 1

24.0810 g (0.88M) of α-$V_2O_5$, 4.7916 g (0.44M) of $Li_2CO_3$ and 3.5 g of carbon were added to 150 ml of water. A composition formed of carbon and of precursors of Li and of V was formed after stirring in a bead mill for 2 hours. Subsequently, said composition was dried for 2 hours in the air at 90° C. and was then subjected to a treatment at 420° C. for 15 minutes under argon. The product obtained is hereinafter denoted by GliV2O5-420 and it comprises 8% of residual carbon.

Example 2

The preparation process of example 1 was employed but with a treatment at 470° C. instead of 420° C. for 15 minutes. The compound obtained is denoted by GliV2O5-470a and it comprises 8% of residual carbon.

Example 3

24.0810 g (0.29M) of α-$V_2O_5$, 4.7916 g (0.146M) of $Li_2CO_3$ and 1.49 g of carbon were added to 50 ml of water. A composition formed of carbon and of precursors of Li and of V was formed after stirring in a bead mill for 2 hours. Said composition was subsequently dried for 2 hours in the air at 90° C. and was then subjected to a treatment at 470° C. for 15 minutes under argon. The product obtained is hereinafter denoted by GliV2O5-470b and it comprises 1% of residual carbon.

Example 4

The preparation process of example 3 was employed but with a treatment at 350° C. instead of 470° C. for 30 minutes. The compound obtained is denoted by GliV2O5-LIV-350.

Example 5

1 g of $V_2O_5$, 0.2306 g of $LiOH.H_2O$ and 0.1453 g of carbon were added to 15 ml of a 30% aqueous hydrogen peroxide solution. A composition formed of carbon and of precursors of Li and of V was formed in a few minutes.

Said composition was subjected to drying at 90° C. overnight in the air and then to a heat treatment at 420° C. for 15 min under argon. The compound obtained is denoted by GliV2O5ph-420.

Example 6 (Comparative)

The preparation process of example 2 was employed but the milling was carried out without addition of water and the treatment at 470° C. was carried out for 45 minutes instead of 15 minutes. The compound obtained is denoted by GliV2O5-BSEC-470 and it comprises $\beta$-Li$_x$V$_2$O$_5$ as impurity.

Example 7

X-Ray Diffraction Analysis

The X-ray diffraction diagrams of the compounds GliV2O5-420, GliV2O5-470a and GliV2O5-BSEC-470 and that corresponding to the composition formed of carbon and of precursors of Li and of V formed after stirring in a bead mill for 2 hours and drying for 2 hours in the air at 90° C. without the second stage of heat treatment have been given in FIG. 1. These diagrams show that the compound carbonaceous $\gamma$-LiV$_2$O$_5$ can be obtained from after 15 minutes of annealing at 420° C. Moreover, it is demonstrated that the use of water during the milling makes it possible to improve the reactivity of the composition formed of carbon and of precursors of Li and of V since a dry mixture gives rise to the appearance of impurities of $\beta$-Li$_x$V$_2$O$_5$ type (*) at 470° C. even after 45 minutes. Furthermore, the diffraction diagram of the composition formed of carbon and of precursors of Li and of V prepared according to comparative example 6 shows that it comprises a lamellar hydrate of formula Li$_{1+a}$V$_3$O$_8$.1H$_2$O in addition to the carbon (11%).

Example 8

Measurement of the Performances

The electrochemical performances of the compound GliV2O5-470b prepared according to example 3 and of the compound GliV2O5-LIV-350 prepared according to example 4 were tested in a Swagelok laboratory battery of the type: Li/liquid electrolyte (EC+DMC+LiPF$_6$)/GliV2O5-470b, operating at ambient temperature. For the positive electrode, 5% by weight of carbon black were added to the compound of the invention.

Figure 2:
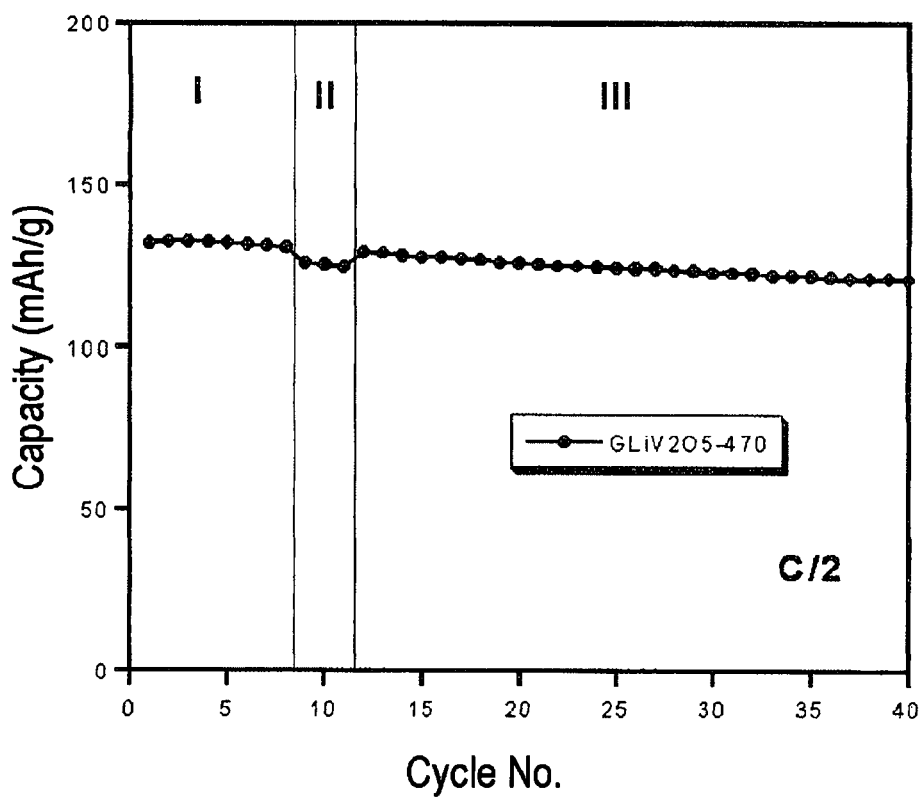
FIG. 2 illustrates the electrochemical performances of the compound GliV2O5-470b prepared according to example 3.

The results obtained with the compound GliV2O5-470b are given in FIG. 2. The cycling conditions correspond to 0.5 Li in reduction and 0.2 Li in oxidation per formula group and per hour. The potential window was from 3 V to 4 V for the cycles from 0 to 8, and then from 12 to 40 (regions I and III). The potential window was from 3 V to 3.75 V for the cycles from 9 to 11 (region II).

Figure 3:
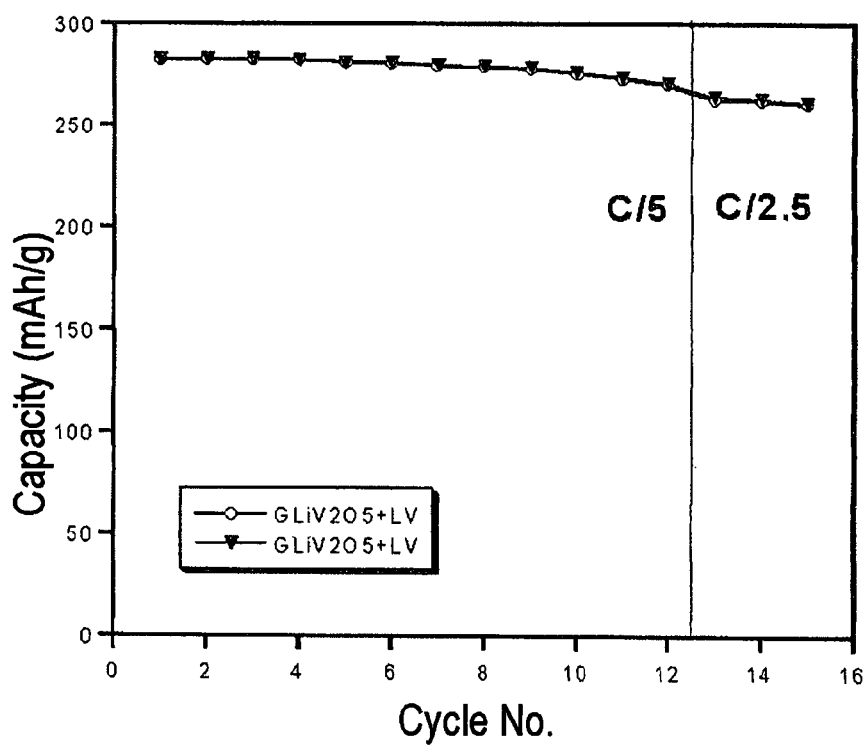
FIG. 3 illustrates the electrochemical performances of the compound GliV2O5-LIV-350 prepared according to example 4.

The results obtained with the compound GliV2O5-LIV-350 are given in FIG. 3. The cycling was carried out between 3.7 V and 2 V with a cycling rate corresponding to 0.4 Li per formula group and per hour for the first 12 cycles and then to 0.4 Li per formula group and per hour.

FIGS. 2 and 3 represent the variation in the capacity for each of the materials. It is thus confirmed in FIG. 2 that, at a cycling rate of 0.5 Li per hour and per formula unit, the compound carbonaceous $\gamma$-LiV$_2$O$_5$ (1% of residual carbon) prepared according to the present invention exhibits a capacity and a cycling behavior similar to that of the prior art (U.S. Pat. No. 6,716,372).

The use of an oxide $\gamma$-Li$_2$V$_2$O$_5$ prepared according to the process of the invention consequently makes possible substantial savings in energy during the manufacture of the positive electrode material for a lithium battery.

What is claimed is:

1. A process for the preparation of a material composed of pure $\gamma$-LiV$_2$O$_5$ or of $\gamma$-LiV$_2$O$_5$ as an intimate mixture with carbon comprising preparing a composition formed of carbon and of precursors of Li and of V and subjecting said composition to a heat treatment, wherein:
    the composition is prepared by bringing carbon, $\alpha$-V$_2$O$_5$ and a Li precursor into contact in amounts such that the molar ratio of the [$\alpha$-V$_2$O$_5$]/[Li] is between 0.95 and 1.05 and the carbon is in excess of at least 25% with respect to the stoichiometry; and
    the heat treatment is carried out in two stages: a first stage at a temperature of between 90° C. and 150° C. for a time of 1 to 12 hours and a second stage under a nitrogen or argon atmosphere or under vacuum at a temperature of between 420° C. and 500° C. for a time of between 10 min and 1 hour.

2. The process as claimed in claim 1, wherein the first stage is carried out with vigorous stirring.

3. The process as claimed in claim 1, wherein the Li precursor is LiOH.H$_2$O or Li$_2$CO$_3$, and the vanadium precursor is $\alpha$-V$_2$O$_5$, the lithium precursor and the carbon are introduced into an amount of water such that a viscous suspension is obtained and vigorous stirring is maintained for a time of 1 to 2 hours.

4. The process as claimed in claim 3, wherein the concentrations of precursors vary between 0.5 mol/l and 5 mol/l for $\alpha$-V$_2$O$_5$, between 0.25 mol/l and 2.5 mol/l for Li$_2$CO$_3$ and between 0.5 mol/l and 5 mol/l for LiOH.H$_2$O.

5. The process as claimed in claim 1, wherein an aqueous solution comprising from 10 to 50% by volume of hydrogen peroxide is added to the composition prepared by bringing carbon, $\alpha$-V$_2$O$_5$ and a Li precursor into contact, vigorous stirring is maintained for 5 minutes and the limiting concentrations which can be used are from 0.05 mol/l to 2 mol/l for $\alpha$-V$_2$O$_5$ and from 0.025 mol/l to 2 mol/l for the Li precursor.

6. The process as claimed in claim 5, wherein the lithium precursor is Li$_2$CO$_3$, LiOH.H$_2$O, LiCl, LiNO$_3$ or a lithium salt of a carboxylic acid.

7. The process as claimed in claim 6, wherein the lithium salt is lithium acetylacetonate, lithium acetate, lithium stearate, lithium formate, lithium oxalate, lithium citrate, lithium lactate, lithium tartrate or lithium pyruvate.

8. The process as claimed in claim 5, wherein an aqueous suspension of $\alpha$-V$_2$O$_5$ and of carbon is prepared and an aqueous peroxide solution is added thereto, the lithium precursor being introduced into the aqueous suspension of $\alpha$-V$_2$O$_5$ and of carbon before the addition of the peroxide solution or after the addition of the peroxide solution and wherein the mixture of the lithium precursor, the aqueous suspension of $\alpha$-V$_2$O$_5$ and of carbon, and the peroxide solution is left under vigorous stirring for 5 min.

9. The process as claimed in claim 5, wherein the respective amounts of Li precursor and of $\alpha$-V$_2$O$_5$ in the reaction medium are such that $0.1/z$ mol·l$^{-1}$<[Li]<1 1/z mol·l$^{-1}$; 0.1 mol·l$^{-1}$<[$\alpha$-V$_2$O$_5$]<1 mol·l$^{-1}$, z being the number of lithium atoms per formula unit of the precursor.

* * * * *